US009822701B2

(12) United States Patent
Blackstock

(10) Patent No.: US 9,822,701 B2
(45) Date of Patent: *Nov. 21, 2017

(54) VARIABLE COMPRESSION RATIO ENGINE

(71) Applicant: Scott Blackstock, Thomaston, GA (US)

(72) Inventor: Scott Blackstock, Thomaston, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,036

(22) Filed: Oct. 29, 2015

(65) Prior Publication Data

US 2016/0047301 A1 Feb. 18, 2016

Related U.S. Application Data

(63) Continuation of application No. 14/268,905, filed on May 2, 2014, now Pat. No. 9,200,564.

(60) Provisional application No. 61/819,032, filed on May 3, 2013, provisional application No. 61/822,802, filed on May 13, 2013.

(51) Int. Cl.
  *F02B 75/04* (2006.01)
(52) U.S. Cl.
  CPC .................. *F02B 75/047* (2013.01)
(58) Field of Classification Search
  USPC ... 123/48 A, 48 B, 48 C, 48 R, 197.3, 197.4, 123/311, 48 D, 78 E, 78 F, 78 R, 90.15, 123/202
  See application file for complete search history.

(56) References Cited

U.S. PATENT DOCUMENTS

| 2,987,896 A | 6/1961 | Griffith |
| 4,538,557 A | 9/1985 | Kleiner et al. |
| 5,146,879 A | 9/1992 | Kume et al. |
| 5,415,588 A | 5/1995 | Wier |

(Continued)

FOREIGN PATENT DOCUMENTS

| CN | 102877960 | 1/2013 |
| DE | 102005050813 | 4/2007 |

(Continued)

OTHER PUBLICATIONS

Final Office Action for U.S. Appl. No. 14/268,905, dated Oct. 7, 2015, Scott Blackstock, "Variable Compression Ratio Engine", 11 pages.

(Continued)

*Primary Examiner* — Carlos A Rivera
*Assistant Examiner* — Ruben Picon-Feliciano
(74) *Attorney, Agent, or Firm* — Lee & Hayes, PLLC; Robert R. Elliott, Jr.

(57) ABSTRACT

A system and method for providing a variable compression ratio internal combustion engine is disclosed. The system can include a crankshaft pivotally coupled to a standard engine block using a plurality of pivoting main bearing caps. The system can pivot the main bearing caps, and thus the crankshaft, to increase or decrease the compression ratio of the engine. The system can also include a plurality of actuators to move one end of the main bearing caps. The crankshaft can comprise one or more flexible joints to enable the crankshaft to move, while the output(s) of the crankshaft remain stationary to enable conventional sealing and power take-off. The compression ratio can be varied continuously during use and can be included in an overall engine management system.

13 Claims, 15 Drawing Sheets

(56) References Cited

U.S. PATENT DOCUMENTS

| | | | |
|---|---|---|---|
| 6,123,178 A | 9/2000 | Hinkel | |
| 6,202,623 B1* | 3/2001 | Ehrlich | F01B 9/02 |
| | | | 123/197.3 |
| 6,406,375 B1 | 6/2002 | Herchenbach et al. | |
| 6,546,900 B2 | 4/2003 | Arai et al. | |
| 9,200,564 B2* | 12/2015 | Blackstock | F02B 75/047 |
| 2004/0089252 A1 | 5/2004 | Park | |
| 2005/0183680 A1 | 8/2005 | Goransson et al. | |
| 2008/0223341 A1* | 9/2008 | Kamada | F02B 75/048 |
| | | | 123/48 B |
| 2009/0281713 A1* | 11/2009 | Jankovic | F01N 5/02 |
| | | | 701/111 |
| 2010/0000497 A1 | 1/2010 | Lee et al. | |
| 2010/0018504 A1 | 1/2010 | Tanaka et al. | |
| 2010/0132671 A1* | 6/2010 | Cho | F02B 75/048 |
| | | | 123/48 B |
| 2011/0048383 A1 | 3/2011 | Pattakos et al. | |
| 2011/0107998 A1 | 5/2011 | Xiong et al. | |
| 2012/0222653 A1* | 9/2012 | Kodama | F02D 13/0238 |
| | | | 123/406.11 |
| 2014/0326219 A1 | 11/2014 | Blackstock | |

FOREIGN PATENT DOCUMENTS

| | | |
|---|---|---|
| DE | 102009038180 A1 | 3/2011 |
| EP | 0560701 | 9/1993 |
| JP | S56010824 | 2/1981 |
| JP | 58220926 | 12/1983 |
| JP | S58220926 A | 12/1983 |
| JP | 2010096160 | 4/2010 |
| JP | 2011241795 | 12/2011 |

OTHER PUBLICATIONS

Office Action for U.S. Appl. No. 14/268,905, dated Mar. 12, 2015, Scott Blackstock, "Variable Compression Ratio Engine", 23 pages.
Office Action for U.S. Appl. No. 14/268,905, dated Aug. 15, 2014, Scott Blackstock, "Variable Compression Ratio Engine", 17 pages.
Translated Korean Office Action dated Apr. 1, 2016 for Korean Patent Application No. 10-2015-7034054, a counterpart foreign application of U.S. Pat. No. 9,200,564, 6 pages.
Translated Japanese Office Action dated Sep. 6, 2016 for Japanese Patent Application No. 2016-512082, a counterpart foreign application of U.S. Pat. No. 9,200,564, 4 pages.
Translated Korean Office Action dated Sep. 5, 2016 for Korean Patent Application No. 10-2015-7034054, a counterpart foreign application of U.S. Pat. No. 9,200,564, 5 pages.
Extended European Search Report dated Mar. 22, 2016 for European patent application No. 14791396.6, 7 pages.
Canadian Office Action dated Nov. 21, 2016 for Canadian patent application No. 2910872, a counterpart foreign application of U.S. Pat. No. 9,200,564, 3 pages.
Translated Korean Office Action dated Nov. 4, 2016 for Korean patent application No. 10-2015-7034054, a counterpart foreign application of U.S. Pat. No. 9,200,564, 5 pages.
European Office Action dated Feb. 21, 2017 for European Patent Application No. 14791396.6, a counterpart foreign application of U.S. Pat. No. 9,200,564, 4 pages.
Mexican Office Action dated Jun. 26, 2017 for Mexican Patent Application No. MX/a/2015/015258, a counterpart foreign application of U.S. Pat. No. 9,200,564, 6 pages.

* cited by examiner

VARIABLE COMPRESSION RATIO ENGINE

CROSS REFERENCE TO RELATED APPLICATIONS

This Application is a continuation of, and claims priority under 35 U.S.C. §120 to, U.S. patent application Ser. No. 14/268,305, filed May 2, 2014, of the same title, which claims priority to, and benefit under 35 USC §119(e) of, U.S. Provisional Patent Application Ser. No. 61/819,032, filed May 3, 2013 and 61/822,802, filed May 13, 2013, both entitled "Variable Compression Ratio Engine." All of these applications are hereby incorporated by reference as if fully set forth below.

BACKGROUND OF THE INVENTION

1. Field of the Invention

Embodiments of the present invention relate generally to variable compression ratio (VCR) internal combustion engines and, specifically to VCR internal combustion engines with moveable crankshafts for varying the compression ratio.

2. Background of Related Art

In a reciprocating internal combustion engine, the compression ratio of an engine is defined as the ratio between the free volume of the cylinder when the piston is at bottom-dead-center (BDC) and the free volume when the piston is at top-dead-center (TDC). All other things being equal, engines tend to be more efficient and produce more power when run at higher compression ratios because this results in higher thermal efficiency. Diesel engines, for example, run at very high compression ratios (18:1 and higher) resulting in compression ignition (i.e., spark plugs or other ignition sources are not required to light the fuel). The higher compression ratio of diesel engines, along with the slightly higher heat content of diesel fuel, results in an engine that provides significantly better fuel mileage than a comparable gasoline engine (30% or more).

In a gasoline engine, however, increasing the compression ratio is limited by pre-ignition and/or "knocking." In other words, if the compression ratio is high enough then, like a diesel, the compression of the fuel causes it to ignite (or, "pre-ignite) before the spark plug fires. This can result in damage to the engine because cylinder temperatures and pressures spike as the fuel/air mixture explodes on multiple fronts, rather than burning uniformly. The maximum acceptable compression ratio in an engine is limited by a number of factors including, but not limited to, combustion chamber and piston design, cylinder and piston cooling, engine loading, and air temperature and humidity. The maximum compression ratio used in production engines is generally relatively conservative (on the order of 10.5:1 for cars and 12.5:1 for motorcycles) to account for, for example, the wide variety of operating conditions and fuel quality.

Due to difficulties associated with reliably moving components in an operating internal combustion engine, however, all currently mass produced engines operate with a fixed compression ratio. As a result, the stock compression ratio tends to be a compromise between a high-compression ratio, which is more efficient—but can result in the aforementioned knocking—and a low compression ratio engine—which is more forgiving of, for example, poor quality fuels, high loads, and/or high temperatures—but has lower efficiency.

The ability to change compression ratio during operation can improve fuel efficiency 35-40% and more. When under light load, such as when the vehicle is cruising down the highway, for example, the compression ratio can be increased significantly to increase fuel mileage. When the engine is under a heavy load, ambient air temperature is very high, or fuel quality is low, on the other hand, the compression ratio can be reduced to prevent knocking. The ability to change compression ratio during operation also allows turbocharging, supercharging, and other power adders to be incorporated much more efficiently.

A number of designs exist that have attempted to vary the compression ratio of an internal combustion engine. Patents have been filed on variable compression ratio engines (VCRE) for over 110 years. A few of the proposed VCRE engines are based on the concept of raising and lowering the cylinder block/head assembly portion of an engine relative to the crankcase. In this configuration, the distance between the piston at top-dead-center (TDC) and the cylinder head can be varied, thus varying the compression ratio of the engine.

Several designs, such as U.S. Pat. No. 6,990,933 B2 and General Motors' DE 10 2009 038 180 A1, filed Mar. 24, 2011 entitled, "Fahrzeugmotor mit einem Kurbeltrieb für eine variable Verdichtung" ("Vehicle Engine with a Crank Mechanism for a Variable Compression") (the '180 patent), achieve variable compression by moving the crankshaft vertically (or substantially vertically) with respect to the cylinder head. This configuration, however, presents challenges with respect to taking power off the engine. In other words, conventional, fixed ratio engines connect to a clutch or torque converter on the rear of the engine and an accessory drive (i.e., for driving alternators, power steering pumps, etc.) on the from the of the engine. In order to effectively couple and seal the cranks shaft at either end, however, it is generally necessary for the crankshaft to rotate about a stationary axis. The '180 patent proposes a gear driven slave shaft to account for this motion. This requires turning the power from the crankshaft through 180 degrees (90 degrees per gear) and adds inertia and complexity to the system.

What is needed, therefore, is a system for varying the compression ratio of an internal combustion engine without unnecessarily increasing the weight or complexity of the engine. The system should enable a portion of the crankshaft containing the crankpins (e.g., the portion proximate the connecting rods) to move vertically with respect to the cylinder head, yet continue to provide the portions of the crankshaft rotating about a fixed axis. In this manner, the ends of the crankshaft can extend through the engine block and be sealed in the conventional manner. Essentially, what is needed is an engine that creates variable compression ratio, yet provides at least a portion of the crankshaft to be rotating about a fixed axis in a fixed location in the block as in conventional engines for the past 125 years. The system should use conventional manufacturing techniques to provide easily manufacturable, reliable engines with, among other things, improved power-to-weight ratios, and fuel consumption. It is to such a system that embodiments of the present invention are primarily directed.

BRIEF SUMMARY OF THE INVENTION

Embodiments of the present invention relate generally to variable compression ratio internal combustion engines and more specifically to a system and method for providing an internal combustion engine in which the portion of the crankshaft containing the crankpins can be raised and lowered, while the output portions of the crankshaft remain stationary. The system can comprise a crankshaft mounted such that it can be raised and lowered, either in translation or rotation (e.g., it can be pivoting about an axis). A variety of mechanisms can be used to move the crankshaft/bearing assembly vertically to place the engine in low compression ratio (LCR) mode, high compression ratio (HCR) mode, or many positions therebetween.

Embodiments of the present invention can comprise a crankshaft for an internal combustion engine. In some embodiments, the crankshaft can comprise a first, fixed output comprising a first end and a second end, a central portion, with a first end and a second end, comprising one or more crankpins and two or more main bearing journals, a second, fixed output comprising a first end and a second end, a first flex joint for flexible coupling the second end of the first output to the first end of the central portion, and a second flex joint for flexibly coupling the first end of the second flex joint to the second end of the central portion. In some embodiments, the first and second outputs can rotate about a fixed longitudinal axis. In other embodiments, the central portion is moveable about a first radius.

In some embodiments, the first and second outputs can be substantially coaxial with the two or more main bearing journals when the crankshaft is in the middle compression ratio (MCR) position. The flex joints can comprise, for example and not limitation, universal joints, double cardan joint, guibos, or constant velocity joints.

Embodiments of the present invention can also comprise a crankshaft system for providing variable compression ratio is an internal combustion engine comprising a block and a cylinder head. In some embodiments, the system can comprise a crankshaft comprising a first, fixed output comprising a first end and a second end, a central portion, with a first end and a second end, comprising one or more crankpins and one or more main bearing journals, a second, fixed output comprising a first end and a second end, a first flex joint for flexible coupling the second end of the first output to the first end of the central portion, and a second flex joint for flexibly coupling the first end of the second flex joint to the second end of the central portion. The system can further comprise a plurality of main bearing caps, with a first end and a second end, the first end pivotally coupled to the block, for rotatably supporting the main bearing journals and a plurality of actuators each disposed proximate the second end of the plurality of main bearing caps for moving the central portion of the crankshaft between a first, low compression ratio (LCR) position and a second, high compression ratio (HCR) position. In a preferred embodiment, the first and second outputs rotate about a fixed longitudinal axis.

In some embodiments, the plurality of actuators can comprise hydraulic lifters. In other embodiments, the plurality of actuators can comprise a plurality of followers, each with a first end and a second end, the first end rotatably connected to the second end of the plurality of main caps, and a camshaft comprising a shaft and a plurality of lobes, rotatably engaged with the plurality of followers for moving the crankshaft between the first, low compression ratio (LCR) position and the second, high compression ratio (HCR) position. In other embodiments, the plurality of actuators can comprise servo motors.

In some embodiments, the first and second outputs can be substantially coaxial with the two or more main bearing journals when the crankshaft is in the middle compression ratio (MCR) position. In some embodiments, the system can further comprise a main bearing cap support shaft for pivotally coupling the first end of the plurality of main bearing caps to the block. In other embodiments, the system can further comprise a main bearing cap alignment shaft disposed proximate, and detachably coupled, to a portion of the plurality of main bearing caps to maintain the alignment of the plurality of main bearing caps.

Embodiments of the present invention can also comprise a short block system for providing a variable compression ratio engine. In some embodiments, the system can comprise a crankshaft, with a first end and a second end. The crankshaft can comprise a first, fixed output comprising a first end and a second end, a central portion, with a first end and a second end, comprising one or more crankpins and one or more main bearing journals, a second, fixed output comprising a first end and a second end, a first flex joint for flexible coupling the second end of the first output to the first end of the central portion, and a second flex joint for flexibly coupling the first end of the second flex joint to the second end of the central portion. In some embodiments, the system can further comprise a main engine block with a first, front end and a second, rear end, a plurality of main bearing caps, with a first end and a second end, the first end pivotally coupled to the engine block, for rotatably supporting the main bearing journals, and a plurality of actuators each disposed at the second end of the plurality of main bearing caps for moving the central portion the crankshaft between a first, low compression ratio (LCR) position and a second, high compression ratio (HCR) position. In some embodiments, the outputs of the first and second flex joints can have a fixed longitudinal axis.

In some embodiments, the longitudinal axis of the first and second outputs is substantially coaxial with the crankshaft when the crankshaft is in the MCR position and the longitudinal axis of the output of the first and second outputs is offset by no more than 0.5" from the longitudinal axis of the crankshaft in the LCR and HCR position.

In some embodiments, the first output can further comprise a first crankshaft snout protruding through a first orifice in the front of the main engine block and a first lip seal for sealing a gap between the first crankshaft snout and the first orifice. In other embodiments, the second output can further comprise a second crankshaft snout protruding through a second orifice in the rear of the main engine block and a second lip seal for sealing a gap between the second crankshaft snout and the second orifice. In some embodiments, the first crankshaft snout can be detachably coupled to one or more of an accessory drive pulley and a balancer and the second crankshaft snout can be detachably coupled to a flywheel.

In some embodiments, the block can further comprise a plurality of support pedestals for supporting the first end of the plurality of main bearing caps and a main bearing cap support shaft for pivotally coupling the first end of the plurality of main bearing caps to the plurality of support pedestals. In some embodiments, the system can further comprise a main bearing girdle detachably coupled to the plurality of main bearing caps to maintain the alignment of the main bearing caps. In other embodiments, each of the plurality of main bearing caps can further comprise an oil passage for providing pressurized oil to one or more of the main bearing journals and the plurality of actuators.

These and other objects, features and advantages of the present invention will become more apparent upon reading the following specification in conjunction with the accompanying drawing figures.

DETAILED DESCRIPTION OF THE INVENTION

Figure 1:
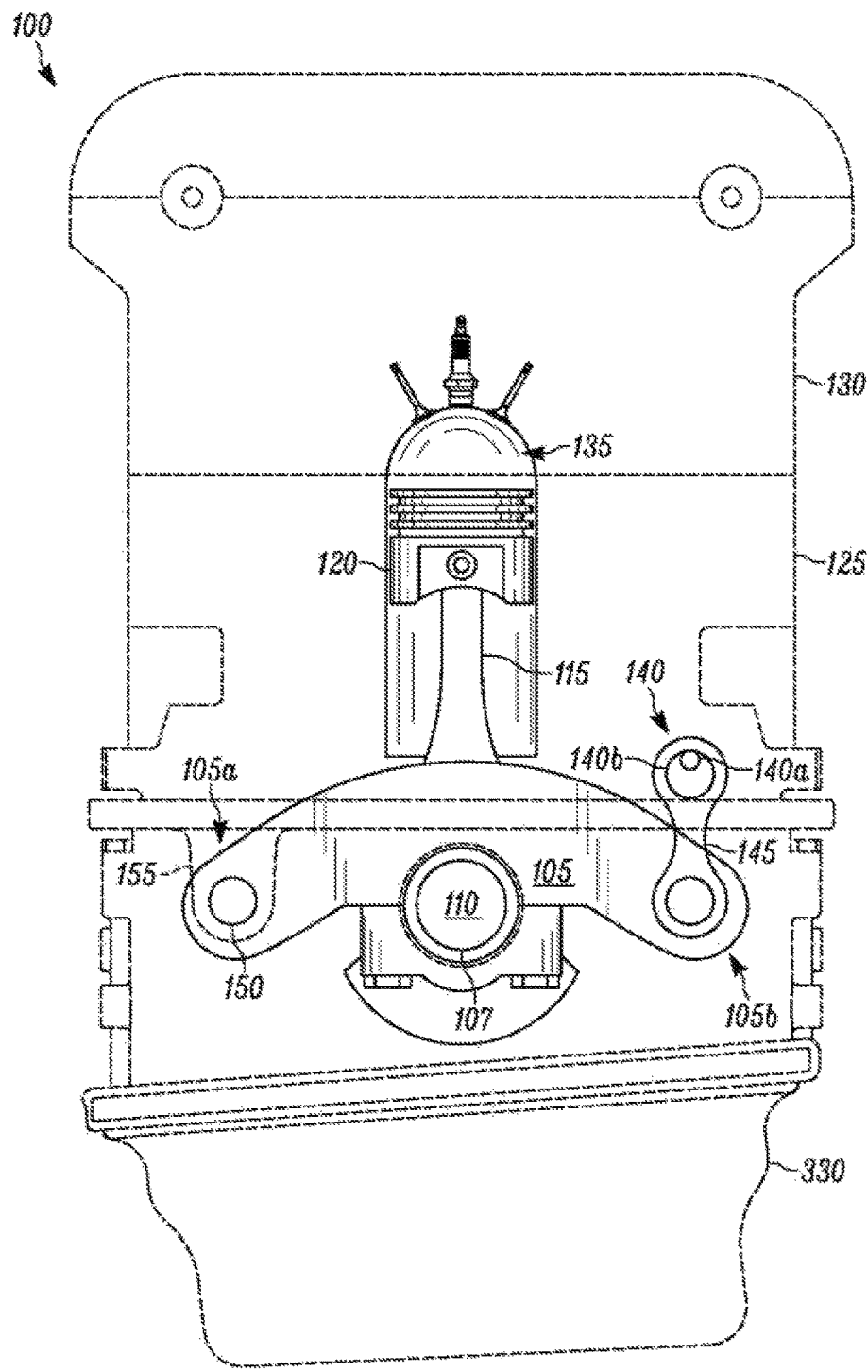
FIG. 1 depicts a partial cross-sectional detailed view of a first variable compression ratio engine (VCRE) in low compression ratio (LCR) mode, in accordance with some embodiments of the present invention.

Embodiments of the present invention relate generally to variable compression ratio internal combustion engines and more specifically to a system and method for providing an internal combustion engine with a crankshaft moveable along one or more axes. The system can comprise a crankshaft housed in moveable main bearing caps. The system enables the crankshaft to move up and down in the y-axis to adjust the distance of the head from the tops of the pistons and, thus, the compression ratio, while providing one or more substantially stationary power take-off points in fixed locations on the block as in conventional engine design.

The system can use a variety of mechanical, electrical, hydraulic, or pneumatic devices to effect the movement of the crankshaft. In some embodiments, the system can comprise a camshaft type system with lobes for moving all main bearing caps in unison. In other embodiments, the system can utilize hydraulic lifters, servo motors, or gears. In still other embodiments, the system can use an eccentric shaft connected to the main bearings.

To simplify and clarify explanation, the system is described below as a system for gasoline internal combustion engines and provides changes in compression ratio as needed during engine operation. One skilled in the art will recognize, however, that the invention is not so limited. The system can be used in flex fuel vehicles, for example, to provide the optimum compression ratio for each type of fuel. The system can be used to position the crankshaft at a first position (on the y-axis) to provide the optimum compression ratio when employing gasoline; for example, but the crankshaft can be moved to a second position to provide the optimum compression ratio when methane, ethanol, or other fuel is selected. Using the system in this manner enables the crankshaft to be moved while the engine is not running, for example, thus eliminating the need for the control system to overcome the forces of compression and combustion. The system can also be deployed to vary the compression ratio of diesel engines. The system can also be deployed in conjunction with, or instead of, other power engine power adders including, but not limited to, turbochargers, superchargers, nitrous oxide, and alcohol or water injection.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

As described above, a problem with conventional systems and methods for varying the compression ratio in an engine has been that they are excessively heavy, complicated, and unstable. One major problem to be solved with raising and lowering the crankshaft to vary compression ratio is how to seal the crankcase on an engine when the crankshaft moves up and down. Conventional fixed crankshafts are generally sealed on either end with a nitrile rubber lip seal, or similar. These seals are very effective at sealing in oil and other fluids provided the mating surface on the crankshaft is relatively clean and smooth. These seals are less effective, however, if there is any damage on the crankshaft (e.g., a groove worn by the seal over time) or if they are installed over a dirty surface. These seals would be completely ineffective in sealing a crankshaft that was actually moving an appreciable distance.

What is needed is a way to move the portion of the crankshaft containing the crankpins while the power take-offs remain stationary. Equally challenging is how to successfully incorporate a crankshaft that is moving on the Y-axis to power timing belts, accessory drive belts, attach a flywheel (and starter), and power a transmission, among other things. Conventional vehicle design of the past 125 years is based on power for these devices being provided by crankshafts rotating about a fixed axis in a fixed location in an engine block. These challenges have thus far prevented the successful implementation of a variable compression ratio engine by raising and lowering the crankshaft.

Prior efforts to employ a movable crankshaft have attempted two basic methods to solve these issues. Several prior patents such as, for example, DE 3 601 528 A1 (the '528 patent), attempt to solve the oil seal challenge by mounting the crankshaft bearings in eccentrically shaped bearing housings. In this manner, when the eccentrics are moved, the axis of rotation of the crankshaft is also moved. The larger challenges of meshing a moving crankshaft with a timing belt, flywheel, and transmission, among other things, does not appear to be addressed by the '528 patent, however.

As discussed above, several prior patents, including the '180 patent, attempt to solve this problem by providing an auxiliary slave shaft offset from the crankshaft. In these references, the auxiliary slave shaft is generally mated to the crankshaft with a gearset. Several problems remain with this solution, however. It is not clear, for example, how pressurized oil is provided to the crankshaft on the '180 patent. In addition, maintaining the engagement of the gears between the crankshaft and the auxiliary shaft is difficult both because of the speed of the rotation (6000-7000 RPM) and the non-linear movement of the crankshaft. The offset of the auxiliary shaft would result in a transmission and front auxiliary drive that was offset or requires complicated and heavy gear sets to relocate the output. This, in turn, makes packaging and weights and balances, among other things, in the car difficult to resolve. Finally, this design also creates challenges with torque, momentum, and inertia when transferring rotational force from the crankshaft 90 degrees to a drive gear then again 90 degrees to an auxiliary slave shaft. Thus far, the above challenges have prevented similar designs from resulting in a viable engine.

What is needed is a design employing a crankshaft that allows the portion of the crankshaft containing the crankpins to be raised and lowered on the Y-axis relative to the cylinder heads, yet maintains the portions of the crankshaft extending through the block in fixed locations rotating about a single fixed axis. This can enable a variable compression ratio engine, yet provides power for timing belts, accessory belts, flywheels, and transmissions in fixed locations as in conventional engine designs.

Figure 2:
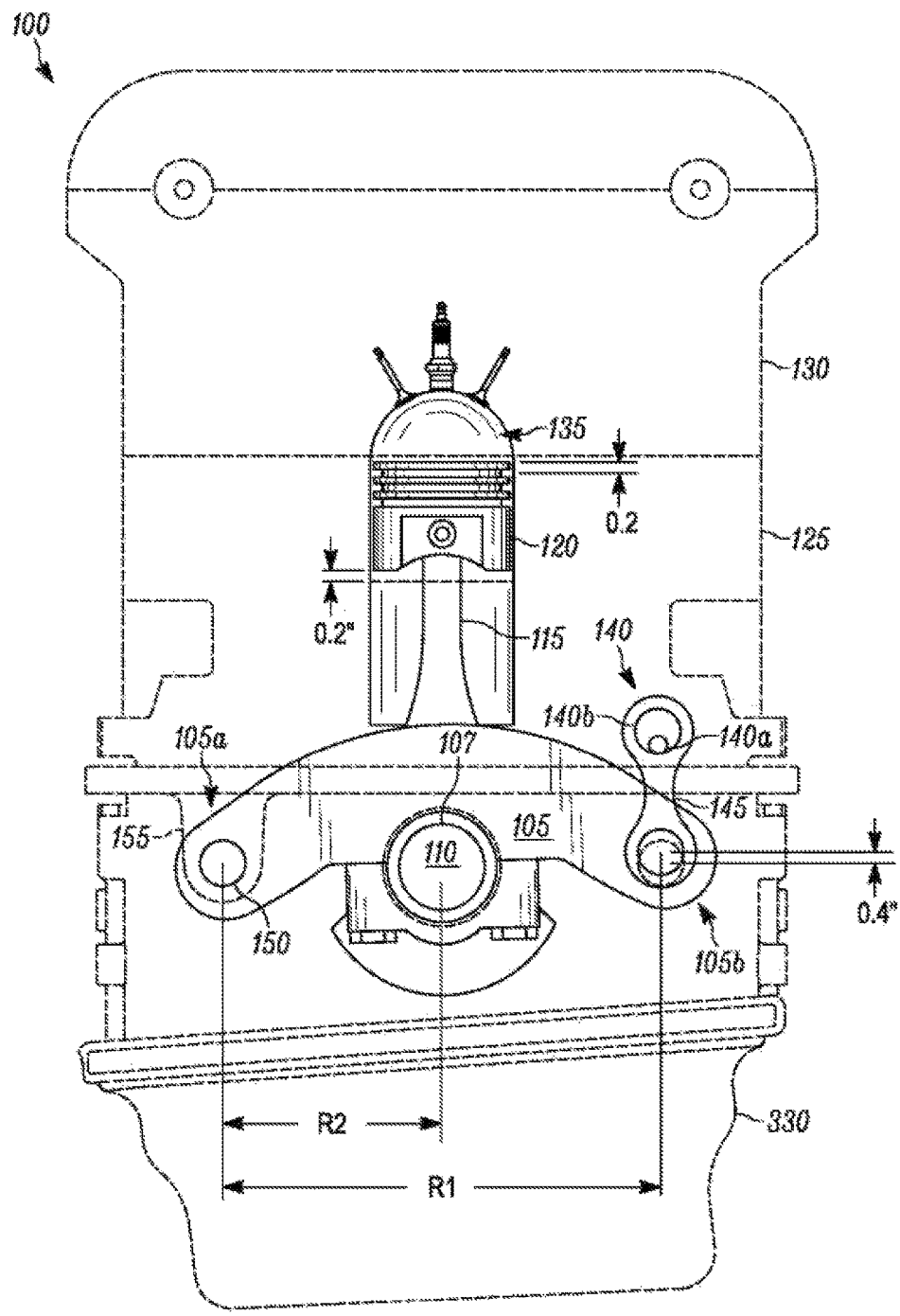
FIG. 2 depicts a partial cross-sectional detailed view of the VCRE of FIG. 1 in high compression ratio (HCR) mode, in accordance with some embodiments of the present invention.

In response, as shown in FIGS. 1 and 2, embodiments of the present invention relate to a system and method for varying the compression ratio of an internal combustion engine, while providing a stable power takeoff therefrom. To this end, FIG. 1 depicts an end view of a main bearing cap 105 for a variable compression ratio engine (VCRE) 100 in a low-compression ratio (LCR) configuration; while FIG. 2 depicts the same engine in a high-compression ratio (HCR) configuration. As with a conventional engine, the VCRE 100 can comprise a rotating crankshaft 110, connecting rods 115, and pistons 120. Similarly, the block 125 and head 130 can be bolted together in the conventional manner, i.e., using large bolts ("head bolts") and a compressible gasket ("head gasket").

Unlike a conventional engine, however, the main bearing caps 105 on the VCRE 100 can be moved relative to the cylinder head 130. In this manner, the distance between the top of the piston 120 and the top of the combustion chamber 135 can be varied to increase or decrease the total combustion volume (e.g., the volume of the combustion chamber 135 in the head+the head gasket+space above the piston, etc.). This, in turn, varies the compression ratio of the VCRE 100.

To change the compression ratio of the VCRE 100, a portion of the crankshaft 110 (and thus, the rods and pistons) can be moved vertically relative to the head 130. As shown, this can be accomplished by pivoting the main bearing caps 105 about one end. This requires, among other things, overcoming the force of gravity (a comparatively small force), inertia, compression, and especially combustion. Controlling these forces has been a major stumbling block for prior designs with variable compression ratio. Ideally, to maintain the geometry of the reciprocating parts 115, 120, however, the movement of the head/block assembly 125, 130 should be substantially limited to movement only in the y-axis (i.e., purely vertical movement), though, as discussed below, some minimal side motion can be absorbed by the rod 115 geometry and piston rings, among other things.

In response, embodiments of the present invention can comprise multiple devices to control the movement of the crankshaft 110. In some embodiments, for example, the crankshaft 110 can be mounted in pivoting main bearing caps 105 using suitable bearings 107. As in a conventional design, the main bearings 107 can comprise, for example and not limitation, plain bearings, needle bearings, or roller bearings. The pivoting main bearing caps 105 can be pivotally coupled to the block 125 on a first end 105*a* and coupled to an actuator 140 on a second end 105*b*. As shown in comparing FIG. 1 to FIG. 2, this can enable the main bearing caps 105 to be rotated about a first radius (R1), which in turn rotates the crankshaft 110 along a second radius (R2). In a symmetrical engine design, i.e., one where the crankshaft 110 is centered on the cap 105, R2 can be half of R1. Of course, other geometries could be used to increase or decrease this ratio (R2/R1) to, for example, increase compression ratio change, mechanical advantage, or positioning accuracy.

In some embodiments, as shown in FIGS. 1 and 2, the first end 105*a* bearing caps 105 can be pivotable mounted to the block 125 using a shaft 150 and pedestals 155 (i.e., similar to a shaft mounted rocker arm). In other embodiments, as shown in FIGS. 4 and 5, provisions for the shaft 150 and bearing caps 105 can be cast directly into a one-piece or multi-piece block 125.

In some embodiments, because the first end of the bearing cap 105 rotates very little, the first end 105*a* of the bearing cap 105 can simply be a machined surface mounted on a shaft 150. In other embodiments, the first end 105*a* of the bearing caps 105 can comprise, for example and not limitation, plain bearings, roller bearings, and needle bearings. In still other embodiments, the bearing caps 105 can be mounted with ball and socket joints and a lock nut, similar to those used for conventional stamped rocker arms.

The second end 105*b* of the caps 105 can be connected to the pivoting mechanism 140 to enable the caps 105 to be pivoted about the shaft 150. In some embodiments, as shown in FIGS. 1 and 2, the second end 105*b* of the cap 105 can be connected to an eccentric, or cam 140, via a dog bone 145, or other suitable link. As usual, the cam 140 can comprise a central shaft 140*a* and an eccentric 140*b*. In this manner, when the cam 140 is rotated, the dogbone 145 can raise or lower the bearing caps 105 in unison to maintain their alignment. In some embodiments, the cam 140 can be rotated by an internal or external gear 147, or other suitable means. See, FIG. 6.

Of course, other mechanisms or actuators 140 could be used to pivot the caps 105. Each cap 105 could be mounted on a hydraulic lifter, for example, with all of the lifters on a common hydraulic or pneumatic circuit (e.g., using engine oil pressure or a separate hydraulic or pneumatic circuit). In this manner, hydraulic or pneumatic pressure could be used to move the caps 105 in unison. In other embodiments, the caps 105 could be moved using, for example and not limitation, servo motors, linear servos, hydraulic or pneumatic rams, shape metal alloys (SMAs), or magneto rheological actuators. In some embodiments, the actuators 140 can also include a spring to return the bearing caps 105 to a "default" position (e.g., the HCR or LCR position). In some embodiments, the springs can comprise, for example and not limitation, conventional wound springs, SMAs, "mouse" type springs, or torsion bars.

As mentioned above, there are several problems associated with raising and lowering the crankshaft 110. One problem is that, if a conventional one-piece crankshaft is used, then it is difficult, if not impossible to seal the ends of the crankshaft 110 that protrude from the block. Conventional lips seals, for example, are simply not flexible enough to seal even this small movement (on the order of 0.2", depending on the application). As a result, these types of seals would likely leak and/or fail in short order. A second problem is how to reliably take power off of the crankshaft 110, e.g., for the transmission on the back and the accessory drive on the front, when the crankshaft 110 is not stationary. It is not feasible, for example, to move the transmission up and down with the crankshaft 110 due to the weight and complexity of the transmission, among other things. To this end, embodiments of the present invention can also comprise a system and method for providing a crankshaft 110 with one or more movable components and one or more stationary output points.

Figure 3A:
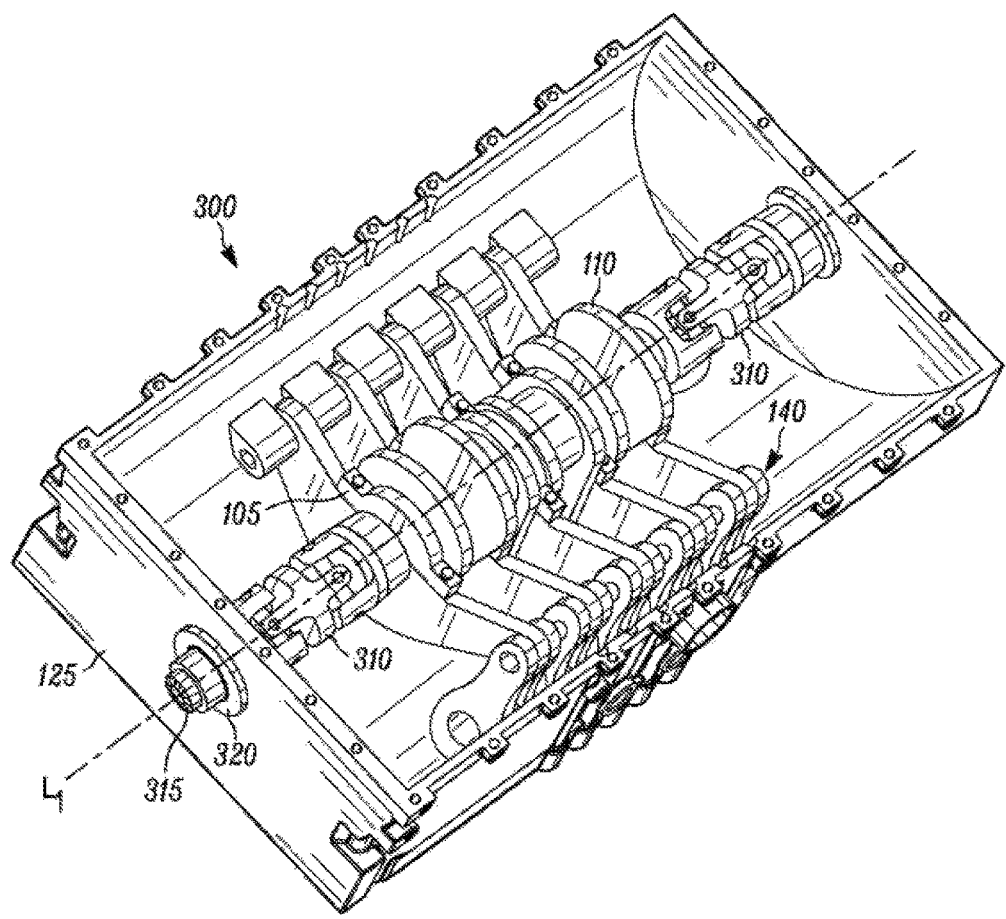
FIG. 3a depicts a bottom, perspective view of the VCRE with a six cylinder block, in accordance with some embodiments of the present invention.

As shown in FIG. 3a, for example, in some embodiments, the system 300 can comprise what is essentially a one piece crankshaft 110 that includes one or more flex joints 310. The main bearing journals of the crankshaft 110 can be mounted as described above, i.e., using the aforementioned pivoting bearing caps 105. This allows the portion of the crankshaft 110 containing the crankpins (i.e., the center of the crankshaft 110 where the connecting rods 115 are affixed) to be raised and lowered relative to the cylinder head 130. The flex joints 310, in turn, can enable the crankshaft 110 to feed power directly to the front and rear of the engine 100 along a fixed longitudinal axis, as in a conventional engine. In this configuration, the crankshaft 110 extends through the block 125 in a fixed location on a shared, fixed axis $L_1$, and provides power in the conventional manner (e.g., powering a hub assembly, balancer, drive pulleys, flywheel, or directly powering a transmission), without the need for gear drives, or other complex and inefficient means. As shown, the snout 315 of the crankshaft 110 can protrude through the block in the conventional manner and using a convention oil seal 320.

As also shown in FIG. 3a, in some embodiments, the block 125 for a four cylinder VCRE engine 100, for example, can be substantially similar to that of the block for a six cylinder conventional engine. In this manner, conventional, mature manufacturing techniques can be used to provide high-quality at relatively low manufacturing costs. In this configuration, the joints 310 can substantially occupy the position formerly occupied by the piston and rod in cylinders 1 and 6 of a conventional six cylinder.

In this configuration, the cylinder head 130, valve cover, and block, for example, can be sized for a four cylinder engine, while the crankcase is essentially the size of a six cylinder engine. This space can be used efficiently, however, by, for example, placing the accessories over this area on the front of the engine 100 (where they would normally be mounted completely in front of the engine). In addition, the top or bottom of these overhangs can include a plate, or service port, to replace or service the flex joints 310 to minimize maintenance costs.

Figure 3B:
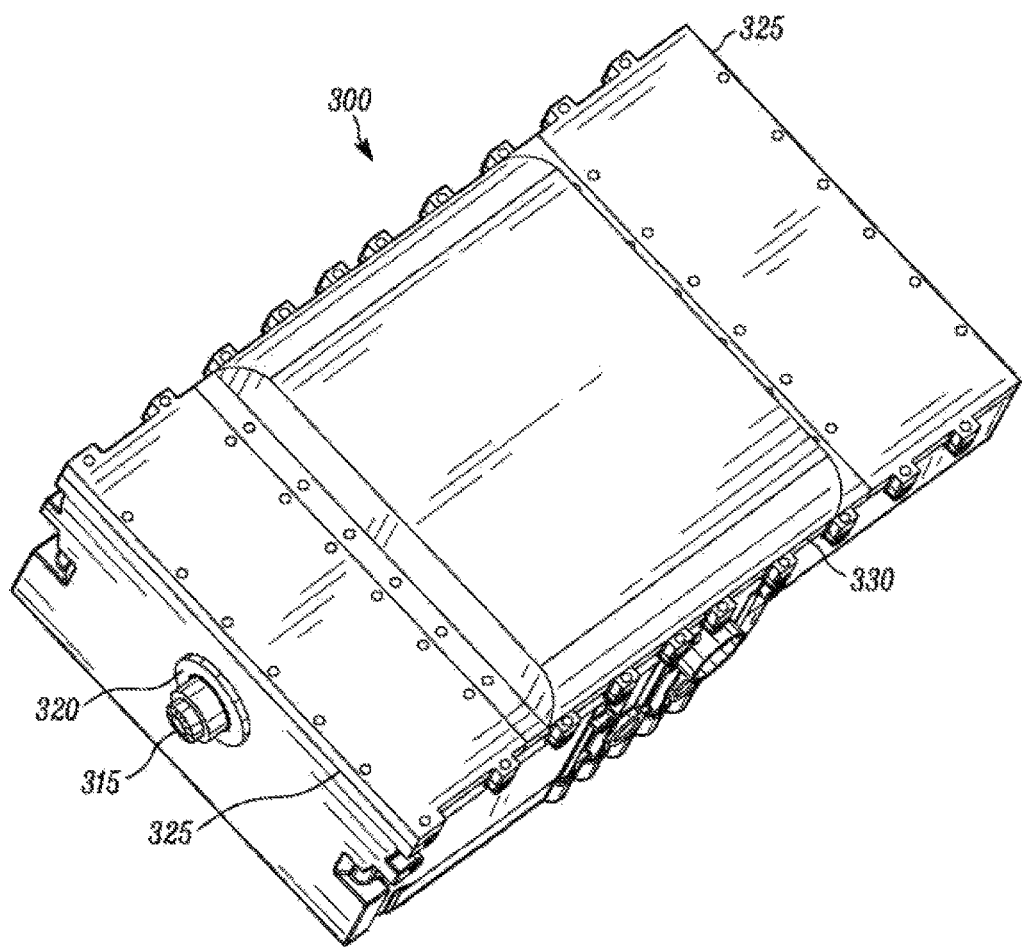
FIG. 3b depicts a bottom, perspective view of the VCRE in FIG. 3a with an oil pan and two access panels, in accordance with some embodiments of the present invention.

As shown in FIG. 3b, in the configuration shown in FIG. 3a, the system 300 can include one or more service covers 325 and a conventional oil pan 330. The service covers 325 can enable the flex joints 310 to be conveniently inspected and serviced, as necessary, without removal of the engine from the vehicle. The oil pan 330 can include, for example, the sump for the oil pump, a drain plug, baffles, and other components as in a conventional oil pan. The covers 325 and oil pan 330 can be sealed in the conventional manner (e.g., using silicone or a gasket) and can be affixed to the block 125 using bolts, or other suitable means.

In addition, since there are no combustion or compression forces exerted on the output shaft bearings, the engine block can be sized essentially the same as for a four cylinder engine with the addition of "nose cones" located in the front and rear of the block to house the flex joints. This design has the added benefit of allowing easier access to the flex joints if maintenance or replacement is required.

Figure 3C:
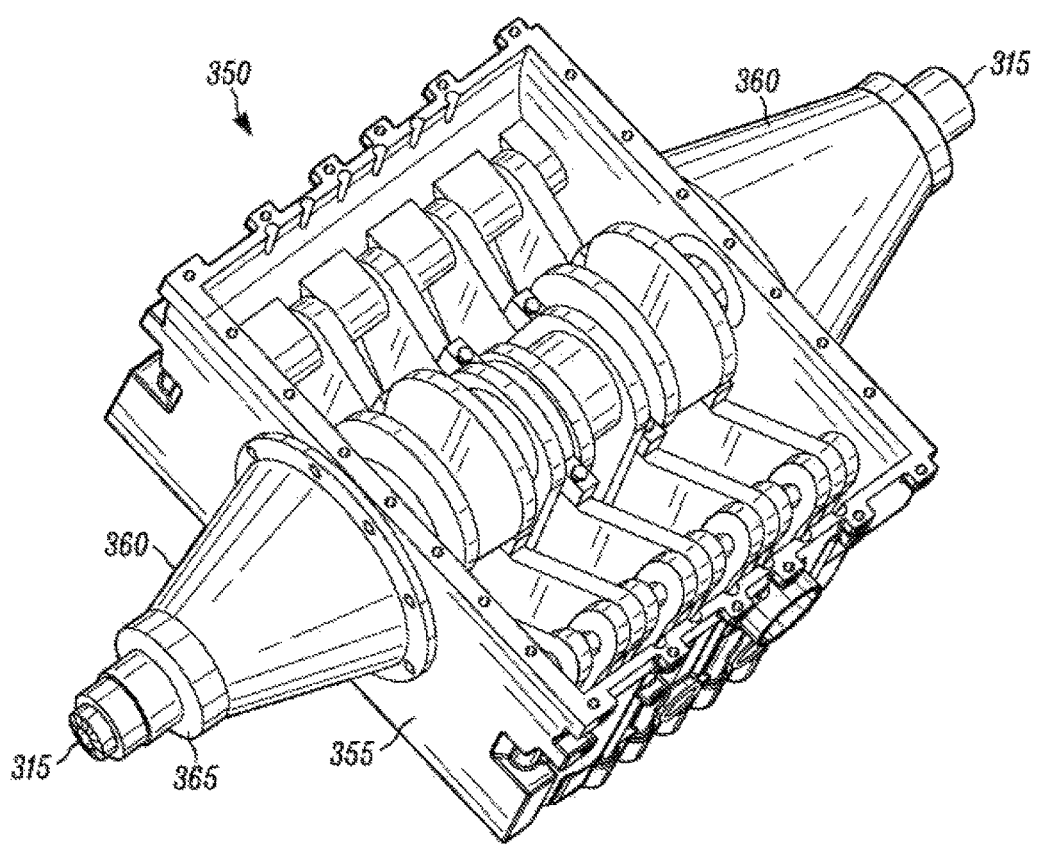
FIG. 3c depicts a bottom, perspective view of a VCRE with output shaft housings and a four cylinder block, in accordance with some embodiments of the present invention.

As shown in FIG. 3c, the system 350 can comprise a four cylinder block 355 with one or more output tailshaft housings 360. In this manner, the engine 350 can have substantially the same size and weight as a four cylinder engine. In addition, the tailshaft housings 360 can be detachably coupled to the engine 350 with, for example, bolts and an appropriate seal (e.g., silicone, o-ring, gasket, etc.). In this configuration, the tailshaft housings 360 can be removed to enable the flex joints 310 to be serviced. In some embodiments, the tailshaft housings can also comprise a seal 365 (e.g., a conventional lip seal) to seal the crankshaft snout 315 where it protrudes through the tailshaft housing 360. In some embodiments, the tailshaft housing 360 can further comprise a bushing or bearing to support the crankshaft snout 315. The bushing can be, for example, a bronze bushing similar to that used in a transmission tailshaft. The bearing can be, for example and not limitation, a plain bearing, a roller bearing, or a taper bearing.

Figure 4A:
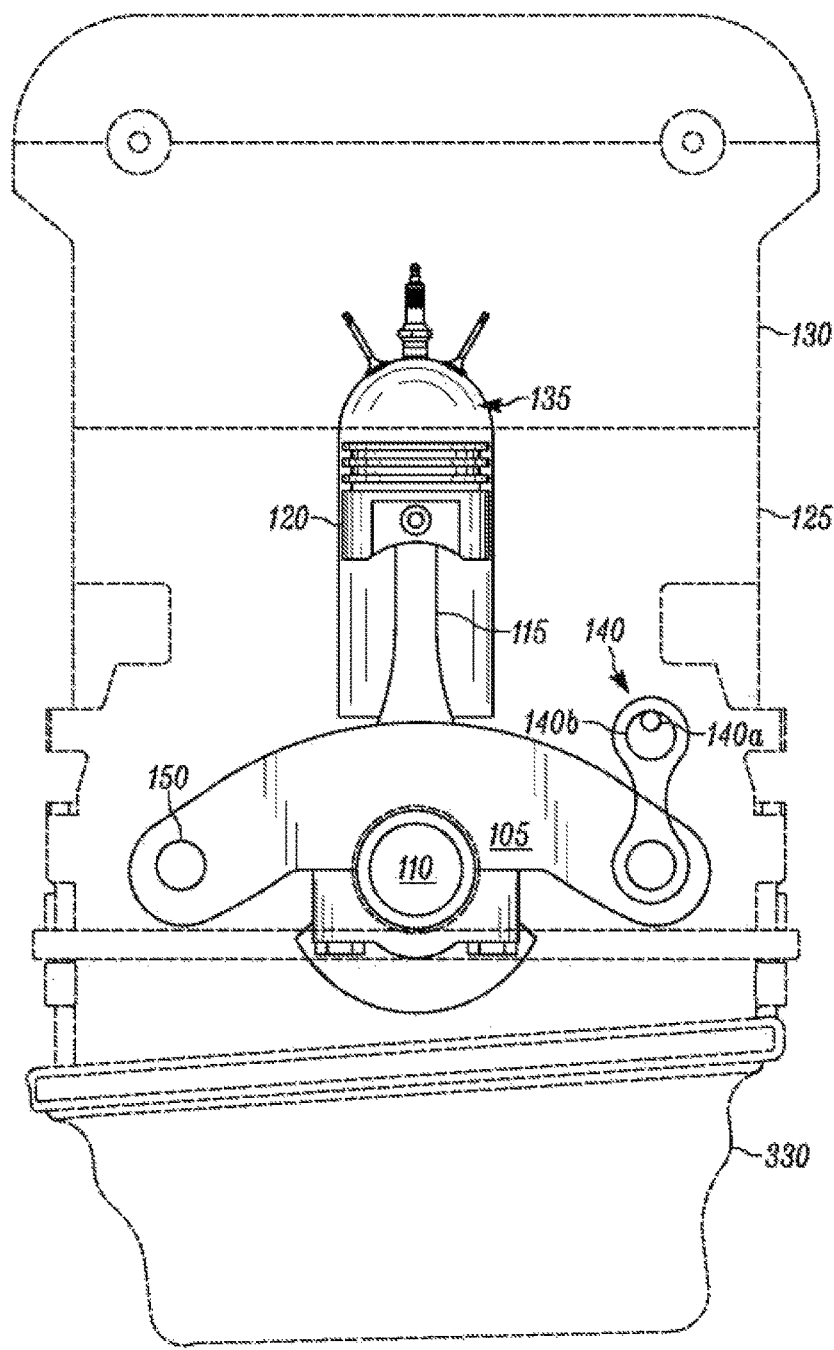
FIG. 4a depicts a partial cross-sectional detailed view of a second variable compression ratio engine (VCRE) in low compression ratio (LCR) mode, in accordance with some embodiments of the present invention.
Figure 4B:
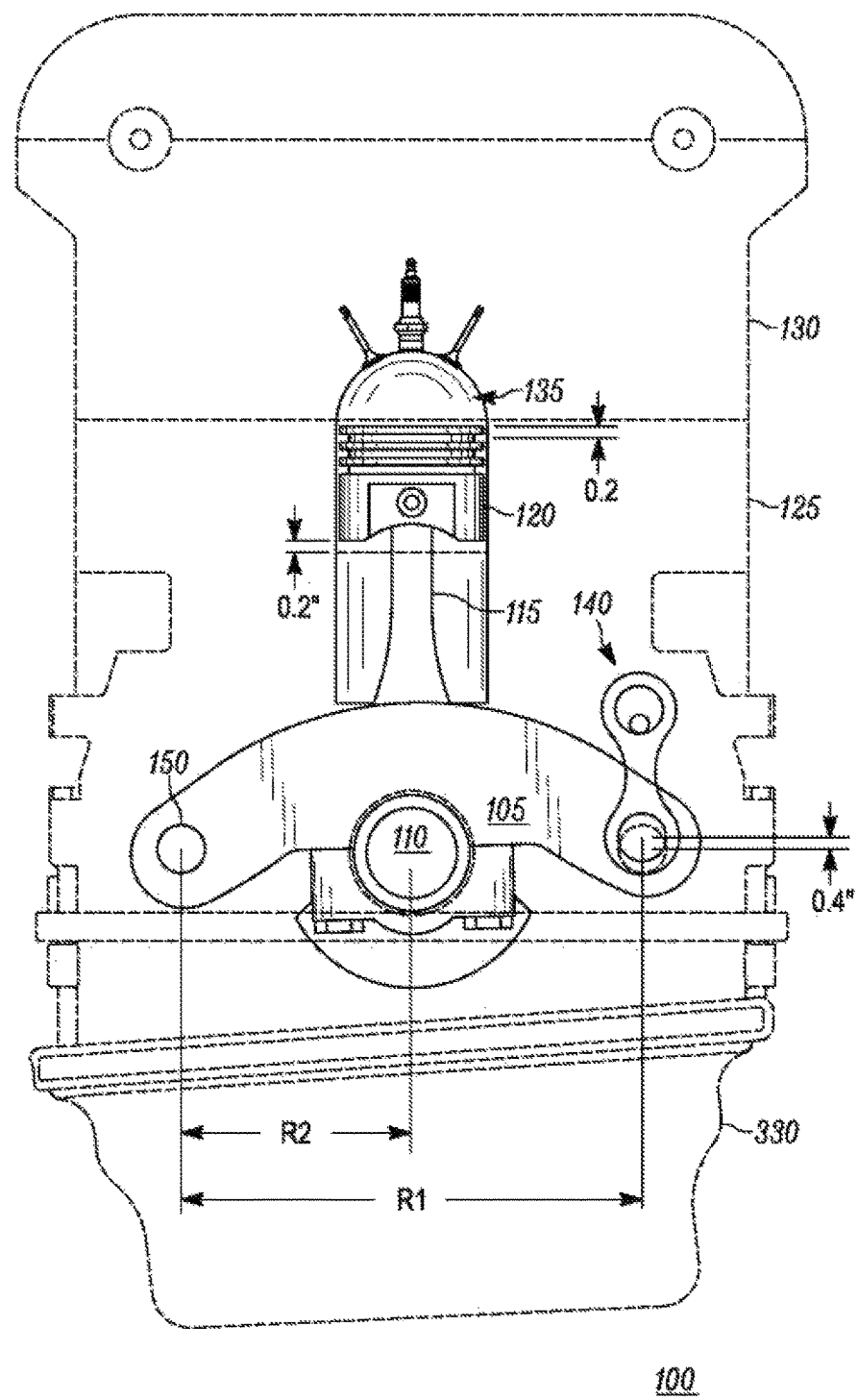
FIG. 4b depicts a partial cross-sectional detailed view of the VCRE of FIG. 4 in high compression ratio (HCR) mode, in accordance with some embodiments of the present invention.
Figure 5:
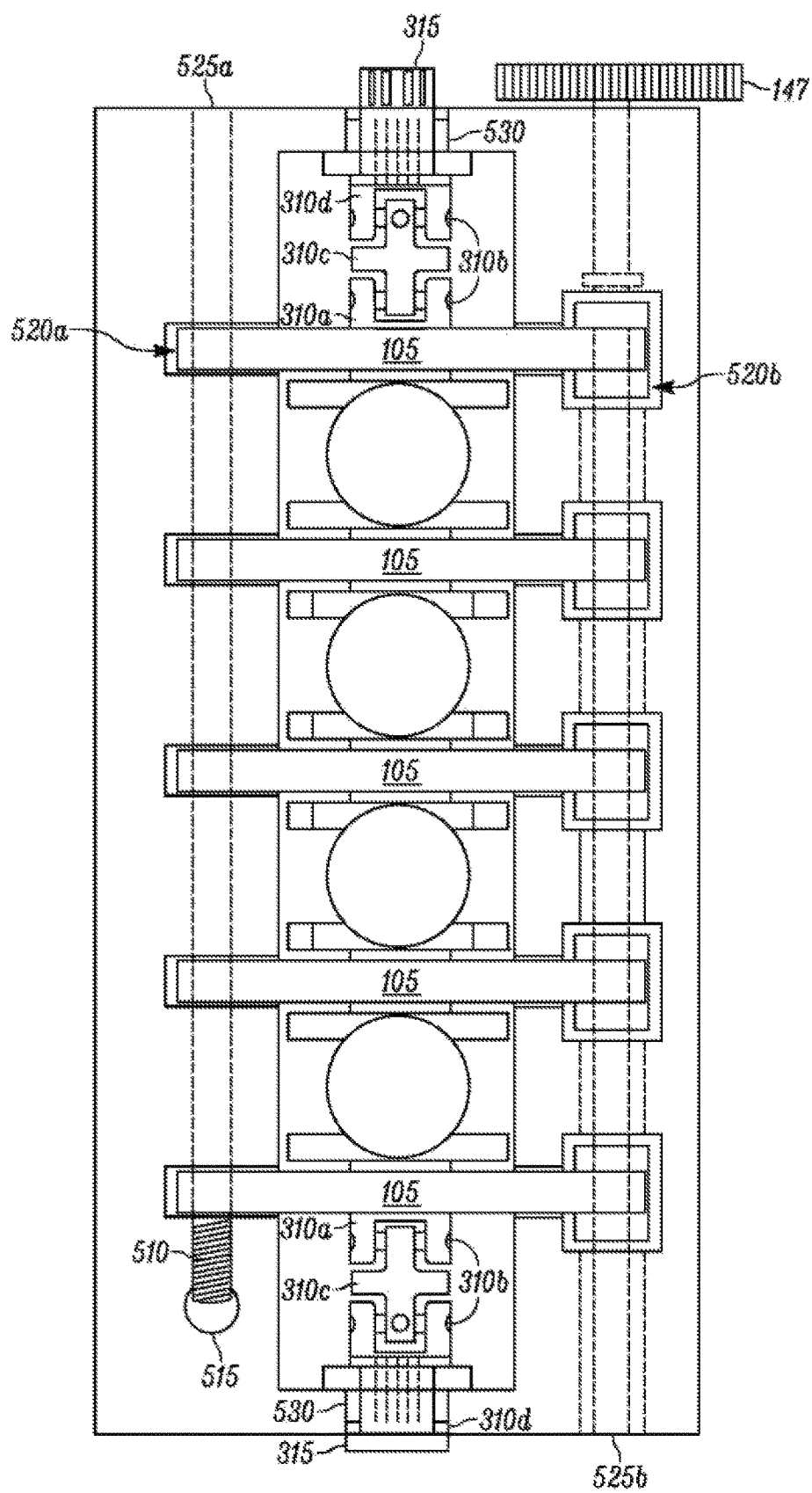
FIG. 5 depicts a bottom view of a VCRE with internal support shafts, in accordance with some embodiments of the present invention.

In some embodiments, as shown in FIGS. 4a-4b and 5, the block 125 can be machined from billet or cast such that it comprises pockets 520a, 520b to enable the main bearing caps 105 to pivot within the block 125. In some embodiments, the block 125 can also comprise one or more bosses 525a, 525b to house the pivot shaft 150 and actuator shaft 140a, respectively. In this manner, for example, the pivot shaft 150 can be inserted through the boss 525a in the front of the block 125 and through the main bearing caps 105 to enable the main bearing caps 105 to pivot thereon. In some embodiments, the shaft 150 can include threads 510 and can be threadably engaged with the block 125. In some embodiments, the block 125 can also include an oil passageway 515 to provided pressurized oil to the pivot shaft 150, main bearing caps 105, main bearings 107, and/or actuators 140.

In some embodiments, the actuator shaft 140a can be inserted through a boss 525b in the back of the block 125 and through the dogbones (or followers) 145, or other actuating means. In some embodiments, the boss 525b cab also act as an oil passage to feed pressurized oil through the actuator shaft 140a, actuators 140, dogbones 145, main bearing caps 105, main bearings 107, and or the pivot shaft 150. In some embodiments, one of the pivot shaft 150 and the actuator shaft 140a can act as an oil supply, while the other of the pivot shaft 150 and the actuator shaft 140a can act as an oil return.

Figure 6:
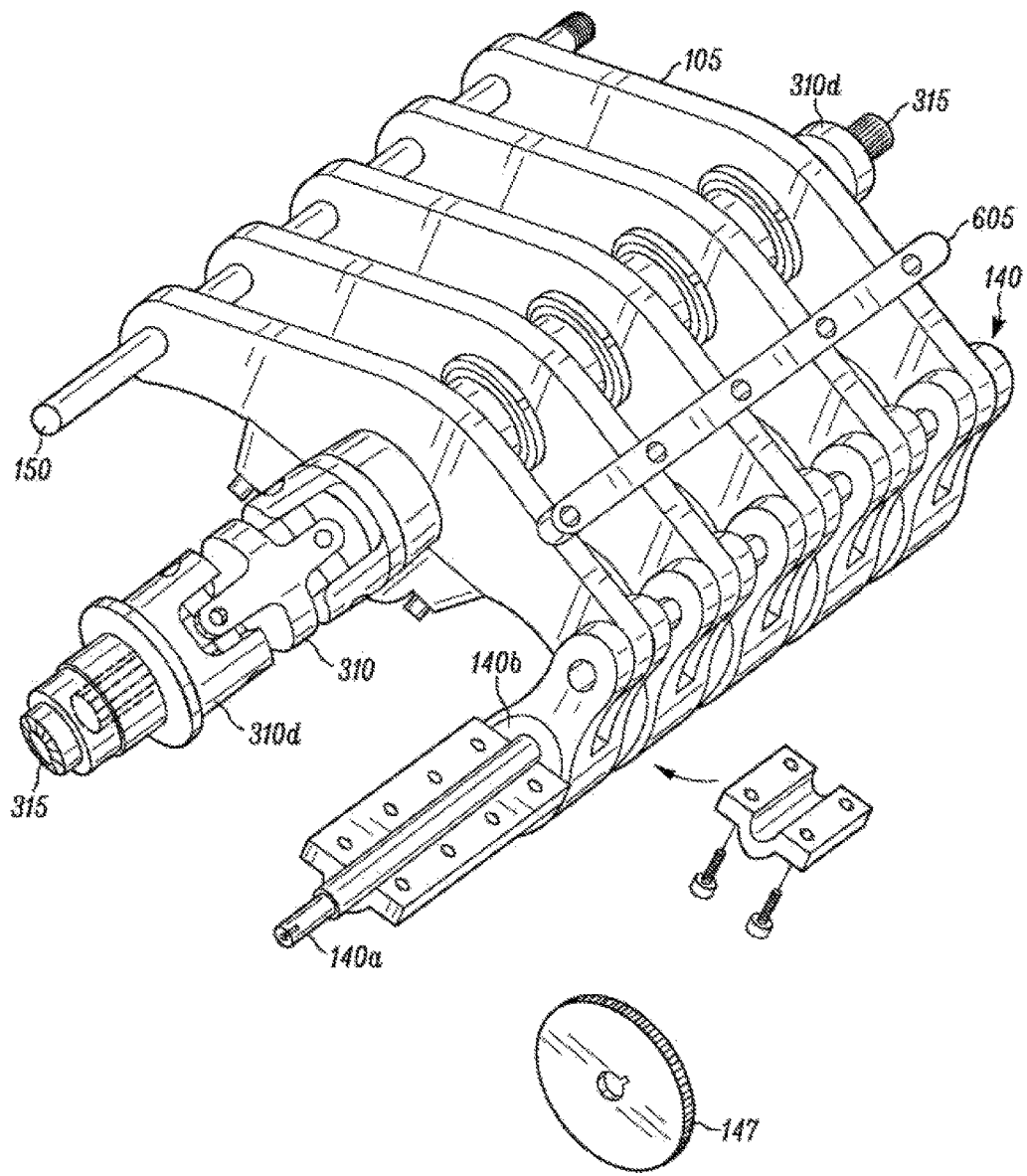
FIG. 6 depicts a perspective view of a bottom end for the VCRE with an alignment bar, in accordance with some embodiments of the present invention.
Figure 7:
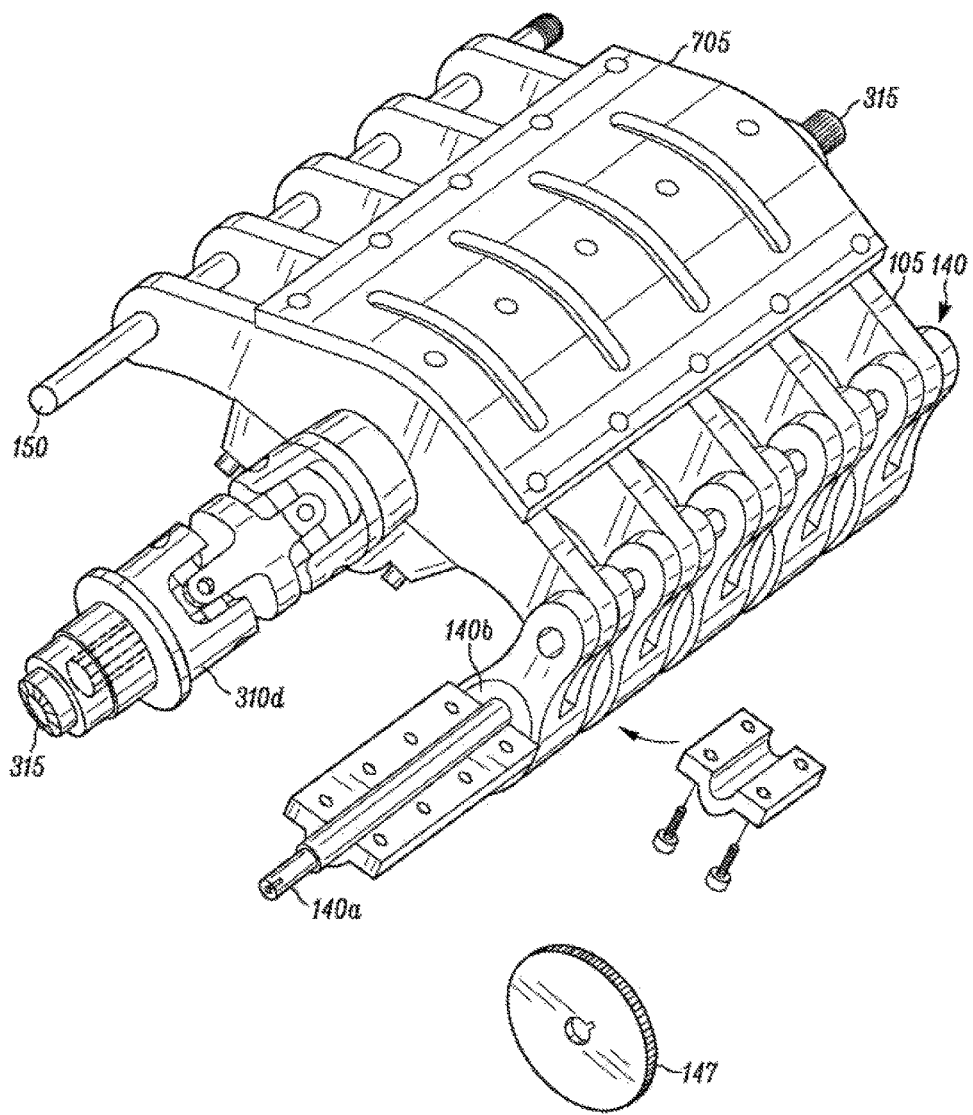
FIG. 7 depicts a perspective view of a bottom end for the VCRE with a stud girdle, in accordance with some embodiments of the present invention.

In some embodiments, as shown in FIGS. 3a, 6, and 7, these joints 310 can comprise double cardan joints, as shown, and can include an input 310a, two universal joints 310b connected with a center yoke 310c, and an output 310d. In this manner, the crankshaft 110 can act essentially as a one piece crankshaft 110 (i.e., power is transmitted directly through the shaft), while enabling the outputs 310d to remain stationary. In this manner, conventional seals, drive systems, flywheels, and other components can remain essentially the same as in conventional engines. This eliminates the weight, complexity, and mechanical inefficiency, among other things, of multiple slave shafts, gears, or other linkages.

Of course, the flex joints 310 can also comprise, for example and not limitation, a single universal joint, Tracta joints, Rzeppa joints, Weiss joints, tripod joints, Thompson couplings, Malpezzi joints, flex-discs (or, "guibos"), jaw couplings, and any other flexible drive joint. For the ease of illustration double cardan type joints are shown, but the optimum joint will be determined by each manufacturer based on, among other things, engine output, number of cylinders, harmonics, and vibrations.

Using these joints 310 enables the outputs 310*d* to be conventionally mounted in the block 125 in a fixed position. This enables the outputs 310*d* to be rotatably mounted in convention plain or roller bearings, for example, with pressurized oiling. This fixed mounting also enables the outputs 310*d* to be sealed using conventional lip or rope seals (e.g., using a conventional "front and rear main seal"), or other suitable means. In some embodiments, the joints 310 can be splash oiled with oil from the sump of the engine. In other embodiments, one or more pressurized oil jets, such as those used for piston cooling, can be provided to lubricate the joints 310. In still other embodiments, the output shaft can power hub assemblies located in fixed locations on the block. This can eliminate the need for pressurized oil supply to the hub bearings. This embodiment eliminates the loads of combustion and compression that are normally exerted on the main bearings 107, thus allowing for the use of conventional roller bearings, or similar, commonly found in hub assemblies.

The joints 310 can be appropriately sized to transmit the torque of the engine to the outputs 310*d*. It should be noted, however, that the conventional u-joints in a rear wheel drive vehicle reliably transmit the torque from the engine to the differential after it has been multiplied by the transmission (e.g., generally in excess of 3× in first gear). As a result, the joints 310 can be relatively small and light when compared to conventional driveshaft u-joints or CV joints. In addition, as discussed below, at least because the distance through which the crankshaft 110 must be moved is very small, the joints are in a vastly cleaner environment, and the joints 310 can be provided with lubrication, the service life of the joints 310 should meet or exceed the life of conventional driveshaft u-joints, which is on the order of 100,000 miles or more.

In some embodiments, the block 125 can comprise seven main bearings caps 105, as in a conventional six cylinder, with the number 1 and 7 bearings 105 rotatably supporting the output 310*d* portion of the crankshaft 110. In other embodiments, as shown in FIG. 5, the block 125 can comprise five main bearings caps 105 to support the main bearings 107 of the crankshaft 110, while the output 310*d* portion(s) of the crankshaft 110 can be supported in separate bearings 530. In still other embodiments, for low speed or low horsepower applications, for example, as few as three main bearings caps 105 can be used as in a conventional V8 engine (i.e., one bearing cap 105 for each pair of crankshaft 110 throws) with the outputs 310*d* supported in separate bearings 530. The main bearings 107 and the output bearings 317 can comprise many types of bearings known in the art including, but not limited to, plain bearings, roller bearings, and needle bearings.

In some embodiments, as shown in FIG. 6, the caps 105 can further comprise one or more alignment bars 605. The alignment bar(s) 605 can be located, for example, above the actuators 140 and bolted (or otherwise detachably coupled to the caps 105) to ensure that that caps 105 move in unison.

In other embodiments, the system can comprise a plurality of alignment bars 605 located, for example, at the first end 105*a*, the middle, and the second end 105*b* of the caps to maintain their alignment. The alignment bar(s) 605 can comprise, for example, aluminum, steel, cast iron, composites, or combinations thereof. Maintaining the alignment of the caps 105 can help reduce vibration and bearing wear, among other things.

In some embodiments, as shown in FIG. 7, the alignment of the caps 105 can be maintained using an external stud girdle 705, such as those found on high performance engines. The stud girdle 705 can comprise a cast or machined brace with a relatively high tensile strength and high rigidity. The stud girdle 705 can comprise, for example, aluminum, steel, cast iron, composites, or combinations thereof. As shown, the girdle 705 can mount onto extended studs or be bolted to the caps 105, and can increase the rigidity and stability of the caps 105, creating a substantially monolithic unit. As in conventional applications, the girdle 705 can help prevent alignment issues and side loading, among other things, increasing bearing life and reducing vibration.

Figure 8A:
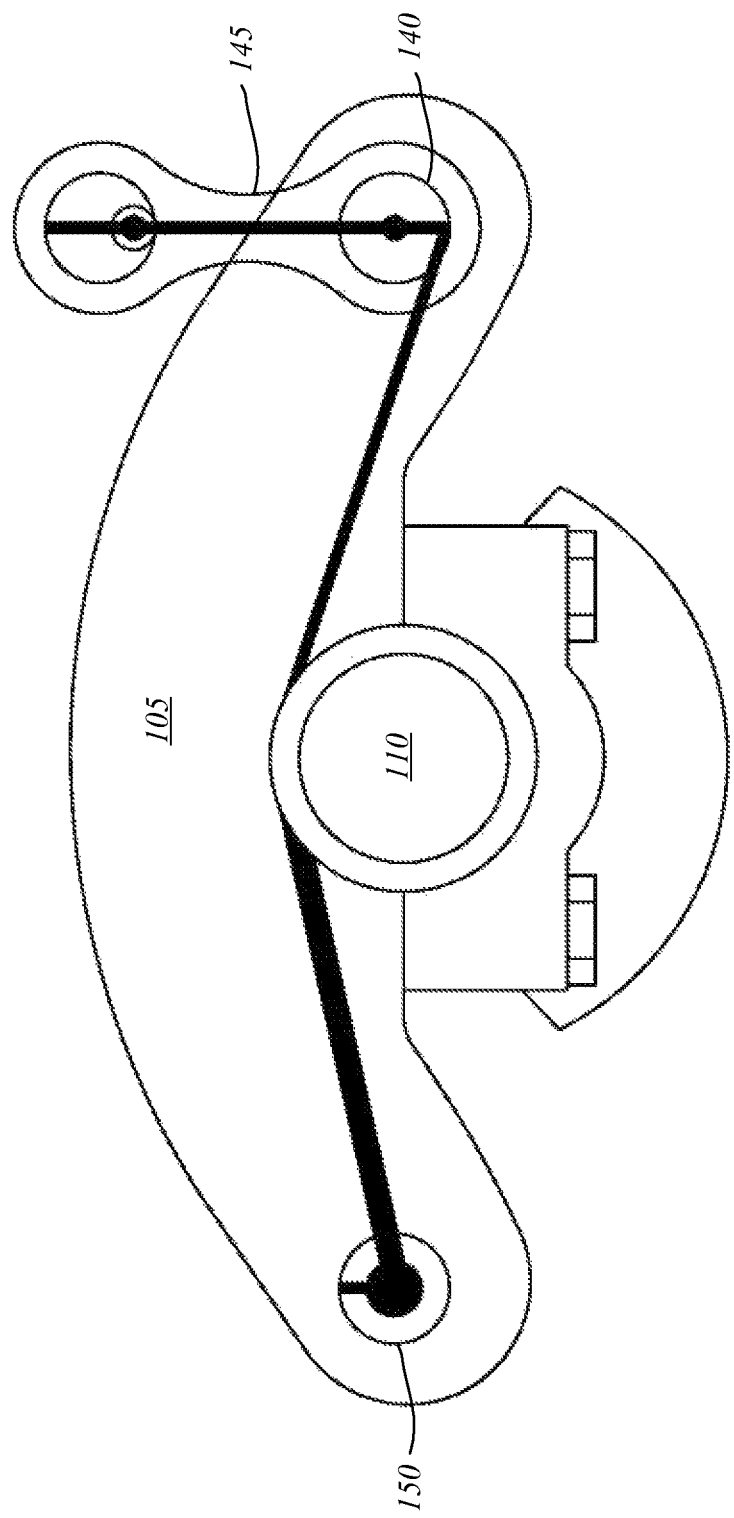
FIGS. 8a and 8b are schematics depicting exemplary oil flow paths for the VCRE, in accordance with some embodiments of the present invention.
Figure 8B:
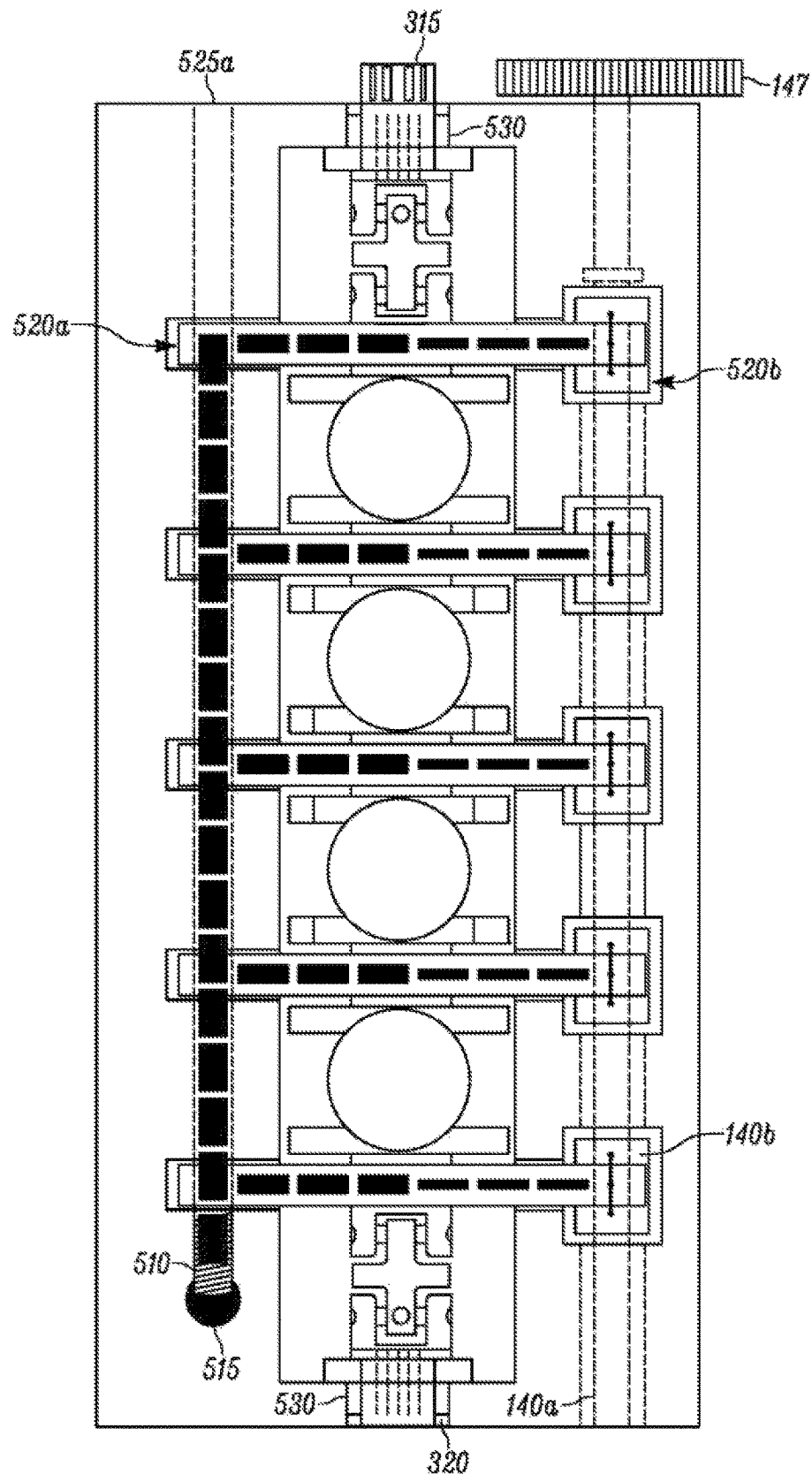

As shown in FIGS. 8*a* and 8*b*, in some embodiments, the shaft 150 and or pedestals 155 can be used to provide pressurized oil to the bearing caps 105 and/or bearings 107. In some embodiments, pressurized oil can be provided via oil passages in the block 125 and directly through the pedestals 155, the shaft 150, and bearing caps 105. In other embodiments, pressurized oil can be provided through a hollow shaft 150 from one end of the engine and fed to the bearing caps 105 through oiling holes and passages (similar to those found in conventional main bearings). In this manner, pressurized oil can be provided through passages in the main caps 105 to the main bearings 107 and/or the second end 105*b* of the caps 105 and pivoting mechanism 140. In other embodiments, pressurized oil can be provided through a shaft 140*a*, or other means, associated with the second end 105*b*. In some embodiments, one of the pivot shaft 150 and the actuator shaft 140*a* can act as an oil supply, while the other of the pivot shaft 150 and the actuator shaft 140*a* can act as an oil return.

Figure 9:
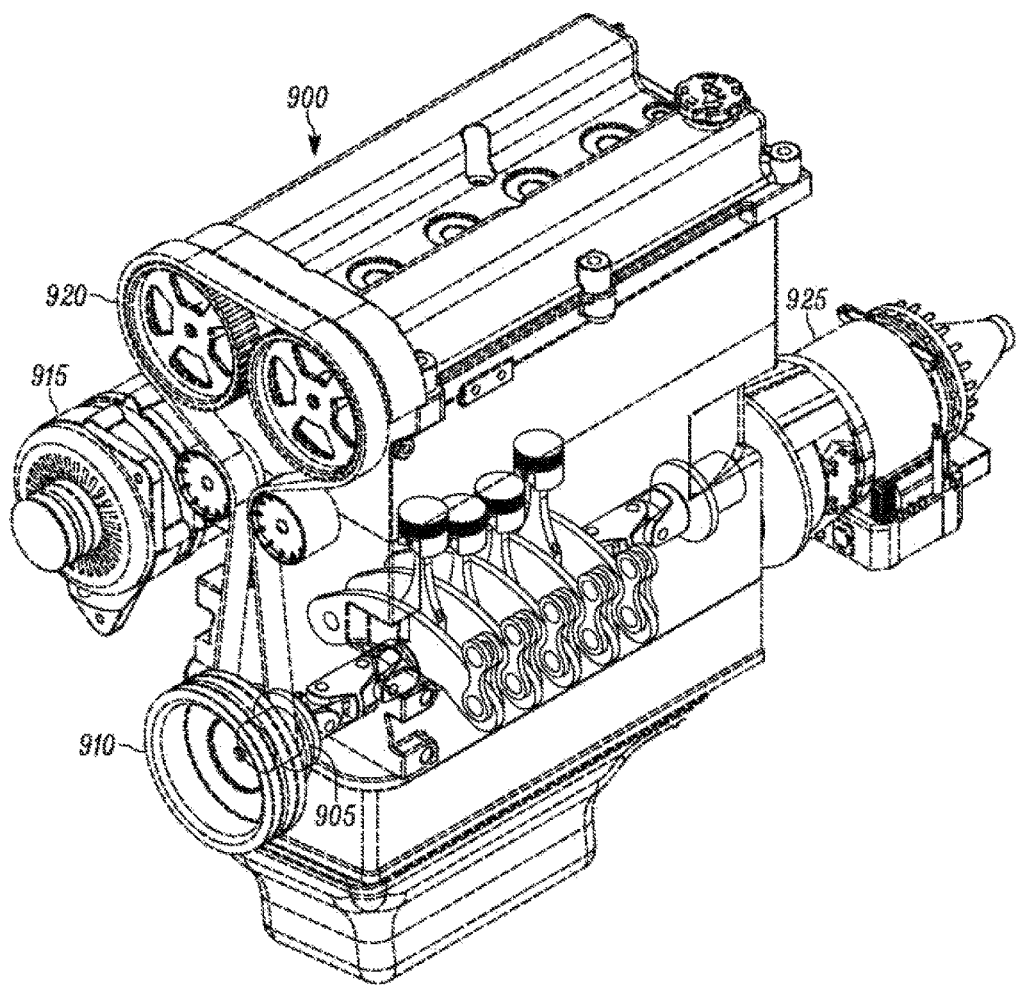
FIG. 9 is a perspective view of the VCRE assembled with exemplary accessories and a transmission, in accordance with some embodiments of the present invention.

As shown in FIG. 9, the system 100 architecture enables a variable compression ratio engine 900 that can be sealed in the conventional manner and that interfaces with conventional components in the conventional manner. As shown, the balancer 905 and front pulleys 910 are stationary to enable convenient power take-off for the front accessories (e.g., an alternator 915) and to drive the timing belt 920, as necessary. In addition, because the rear output 310*d* is stationary, the crankshaft 110 can be easily connected to a conventional transmission 925 in the conventional manner.

Example 1

Table 1, below, contains dimensions suitable for a wide variety of engine configurations. The exact dimensions used below are common to the ubiquitous 350 c.i. (5.7 L) "small block" Chevrolet engine produced by General Motors.

|  | LCR | MCR | HCR |
|---|---|---|---|
| Bore | 4.00" | 4.00" | 4.00" |
| Stroke | 3.500" | 3.500" | 3.500" |
| Head Gasket Bore Diameter | 4.030" | 4.030" | 4.030" |
| Compressed Head Gasket Height | 0.021" | 0.021" | 0.021" |
| Cylinder Head Combustion Chamber Volume | 80 cc | 80 cc | 80 cc |
| Piston Dome | 19.5 cc | 19.5 cc | 19.5 cc |
| Piston height (below Deck Height) | −0.2" | −0.1" | 0.0" |

|  | LCR | MCR | HCR |
|---|---|---|---|
| Total Combustion Chamber Volume | 106.07 cc | 85.48 cc | 64.89 cc |
| Compression Ratio | 7.79 | 9.43 | 12.11 |

The total combustion chamber volume of the engine, i.e., the total volume above the piston when the piston is at top dead center (TDC), $V_{TDC}$ is equal to:

$$V_{TDC} = V_{CC} + V_{HG} - V_{PD} + V_{PH} \quad (1)$$

where $V_{CC}$=the cylinder head combustion chamber volume, $V_{HG}$=the cylinder head gasket volume, $V_{PD}$=the piston dome volume and $V_{PH}$=volume due to the piston height (i.e., positive for piston height below the cylinder block and negative for above). In the LCR example above for example, the total combustion chamber volume is given by:

$$V_{TOT} = 80cc + \left[\pi\left(\frac{4.030}{2}\right)^2 \times .021 \times 16.387\right] -$$
$$19.5cc + \left[\pi\left(\frac{4.000}{2}\right)^2 \times .2 \times 16.387\right] = 106.07cc$$

where 16.387 is the conversion factor from cubic inches to cc's. Similarly, the volume of the cylinder when the piston is at bottom dead center (BDC), $V_{BDC}$ is equal to:

$$V_{BDC} = V_{TDC} + (\text{bore} \times \text{stroke})$$

which for the LCR example above yields:

$$V_{BDC} = 106.07cc + \left[\left[\pi\left(\frac{4.000}{2}\right)^2 \times 3.5\right] \times 16.387\right] = 826.81cc$$

Finally, the compression ration can be calculated as:

$$CR = \frac{V_{BDC}}{V_{TDC}} = \frac{826.81cc}{106.07cc} = 7.79$$

As shown in Table 1, due to the large area of the piston 120, a relatively small change in piston height yields a significant change in overall combustion chamber volume (and, thus, compression ratio). As mentioned above, this can enable the engine to work more efficiently depending on load, temperature, fuel quality, etc. In the example above, a 7.79:1 compression ratio, for example, is fairly low and would work for almost any fuel without fear of detonation. This low compression ratio is on par with older pick-up truck engines, for example, that work under heavy loads and sometimes on low quality "off road" fuel. In addition, this low compression ratio can be utilized to provide extremely efficient turbocharging or supercharging without detonation. This can enable a four cylinder 2.5 L engine to produce more torque and horsepower than a 5.0 liter V-8, for example.

A middle compression ratio (MCR) of 9.43:1 compression ratio, on the other hand, is a good mid-load/mid-quality fuel compression ratio. This is in the range of many modern engines' compression ratios, which tend to fall between 9.0:1 and 10.5:1. This can enable the engine to work fairly efficiently in a wide variety of situations or with a fairly wide range of fuel qualities. With proper cooling (e.g., after- or intercooling), this MCR could also be used with modest amounts of boost (e.g., 5-6 PSI) from a turbo- or supercharger to provide increased power and efficiency.

Finally, the high-compression position, at 12.11:1, is approaching the limits of compression ratio for standard "pump" gasoline in a conventional engine. Higher compression ratios are, at present, generally reserved for exotic sports cars and motorcycles. The "standard" compression ratio limit of around 12:1 can be raised with careful combustion chamber design and special controls such as, for example and not limitation, direct injection and knock sensors, which enable control of spark and fuel delivery to reduce detonation. These features can require expensive electronics, pumps, and fuel injectors, however, to achieve this performance. Embodiments of the present invention, however, can enable the used of very high compression ratios, not due to expensive components and controls, but when the conditions under which the engine is operating are appropriate (e.g., high-quality fuel, low ambient temperatures, etc.). This can enable a relatively conventional engine design to yield the increased performance and efficiency of very high compression ratios without detonation or other deleterious side effects.

The primary benefit of utilizing a high compression ratio (e.g., 11.5:1 and higher) is the improved efficiency and fuel economy achieved when the engine is under light loads, such as idling at traffic signals and/or cruising at highway speeds. This ability to increase compression ratio under light loads significantly increases fuel economy (30% or more).

Of course, embodiments of the present invention are not limited to just three positions, but many positions between the LCR position and the HCR position. In his manner, crank height can simply be controlled as an additional engine parameter—like ignition timing and fuel delivery—to maximize performance and minimize detonation, emissions, fuel consumption, and other harmful effects. In this manner, the system can substantially continuously change crank height based on feedback from, for example, oxygen sensors, throttle position sensors, knock sensors, and intake air and engine temperature sensors to maximize torque, horsepower, and fuel economy, while minimizing heat build-up, detonation, and harmful emissions (e.g., oxides of nitrogen).

The system 100 can also be used for maximizing efficiency on a particular fuel or in conjunction with a particular power adder. If the engine is designed to burn E85 (85% ethanol/15% gasoline), for example, the compression ratio range can be shifted (or expanded) to provide even higher compression ratios (up to approximately 14.5:1). This can be helpful, for example, because E85 provides less energy than gasoline and thus, provides approximately 20-30% poorer fuel mileage. Some of this loss could be recovered, however, if E85 was simply burned more efficiently (i.e., at a higher compression ratio). E85 also burns more cleanly and at a lower temperature than gasoline, which can reduce emissions and increase engine life. Ethanol can also be produced from renewable sources and in an eco-friendly manner.

The system 100 can also be used in conjunction with power adders to maximize efficiency. The system 100 can be used in conjunction with a turbocharger, for example, to decrease spool-up time and "turbo-lag." This can be accomplished, for example, by maintaining a relatively high compression ratio when the turbo charger is below a predetermined amount of boost to reduce turbo lag. As the turbo spools-up, however, the compression ratio can be mechanically lowered with the crankshaft 110 to prevent overboosting, which can cause detonation, blown head gaskets, and other mechanical issues.

Figure 10:
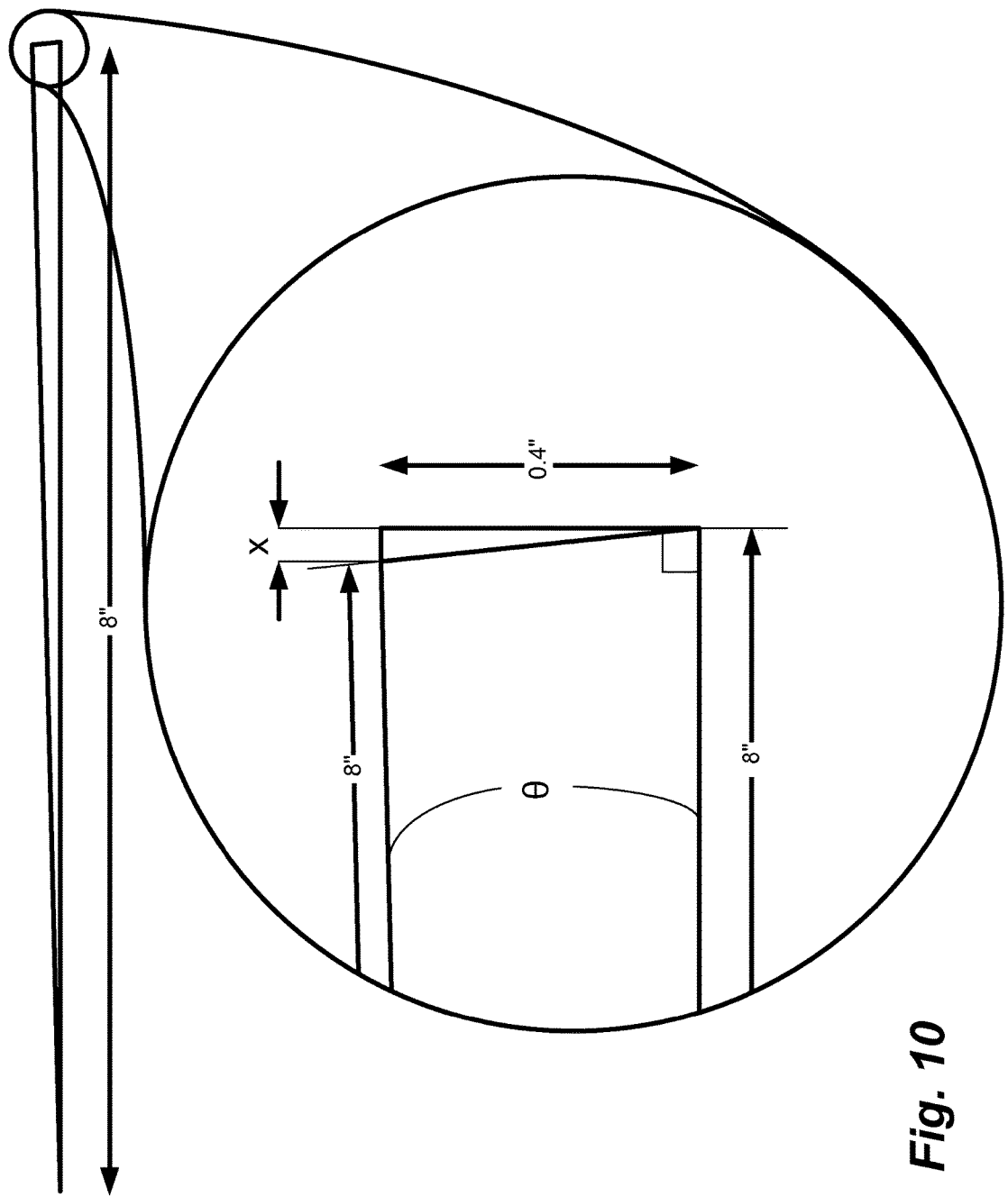
FIG. 10 is a schematic of the geometry for one embodiment of the VCRE, in accordance with some embodiments of the present invention.

As discussed above, the movement of the crankshaft 110 would ideally be completely vertical. And while this can be achieved using a combination of mechanisms discussed above, the design can be somewhat simpler with a pivoting cap 105. As discussed in Example 1, however, the distances through which the crank must be moved are relatively small. In addition, as shown in FIG. 10, the geometries are such that the side movement of the crankshaft 110 is extremely small.

Given the geometries discussed above for Example 1, raising the crankshaft 0.2" provides an excellent range of compression ratios. As shown in FIG. 10, using the specifications from Example 1 and assuming, for example, an 8" wide main bearing cap (i.e., 4" from the pivot 150 to the center of the crankshaft 110), the angular movement of the crankshaft 110 can be calculated as:

$$\theta = \sin^{-1}\frac{0.4}{8} = 2.87° \quad (1)$$

which is a relatively small number. In addition, the horizontal movement of the crankshaft 110 resulting from raising the crankshaft 110 0.2" (and thus the end 105b of the main bearing cap 105 0.4") can be calculated as:

$$\sqrt{(x+8)^2} = \sqrt{8^2 + 0.4^2} \quad (2)$$

This translates to a horizontal movement of the crankshaft 110 of approximately 0.00999". Thus, while this type of movement is somewhat significant with respect to, for example, main bearing 107 clearances, this can be easily absorbed by the piston rings and other clearances and is minuscule with regard to u-joints, guibos, and other types of flex joints. This side movement can also be further reduced with wider main bearing caps, for example, which could be easily packaged in the VCRE 100.

In addition, while shown pivoting up from a horizontal position in the figures, other configurations could be used. In some embodiments, for example, the main bearing caps 105 can be substantially horizontal in the MCR position. In this manner, the main bearing caps 105 can be pivoted down 0.1" to the LCR position and up 0.1" to the HCR position. This would reduce the horizontal movement of the crankshaft 110 to approximately 0.0005", further reducing, for example, bearing wear and harmonics.

Figure 11:
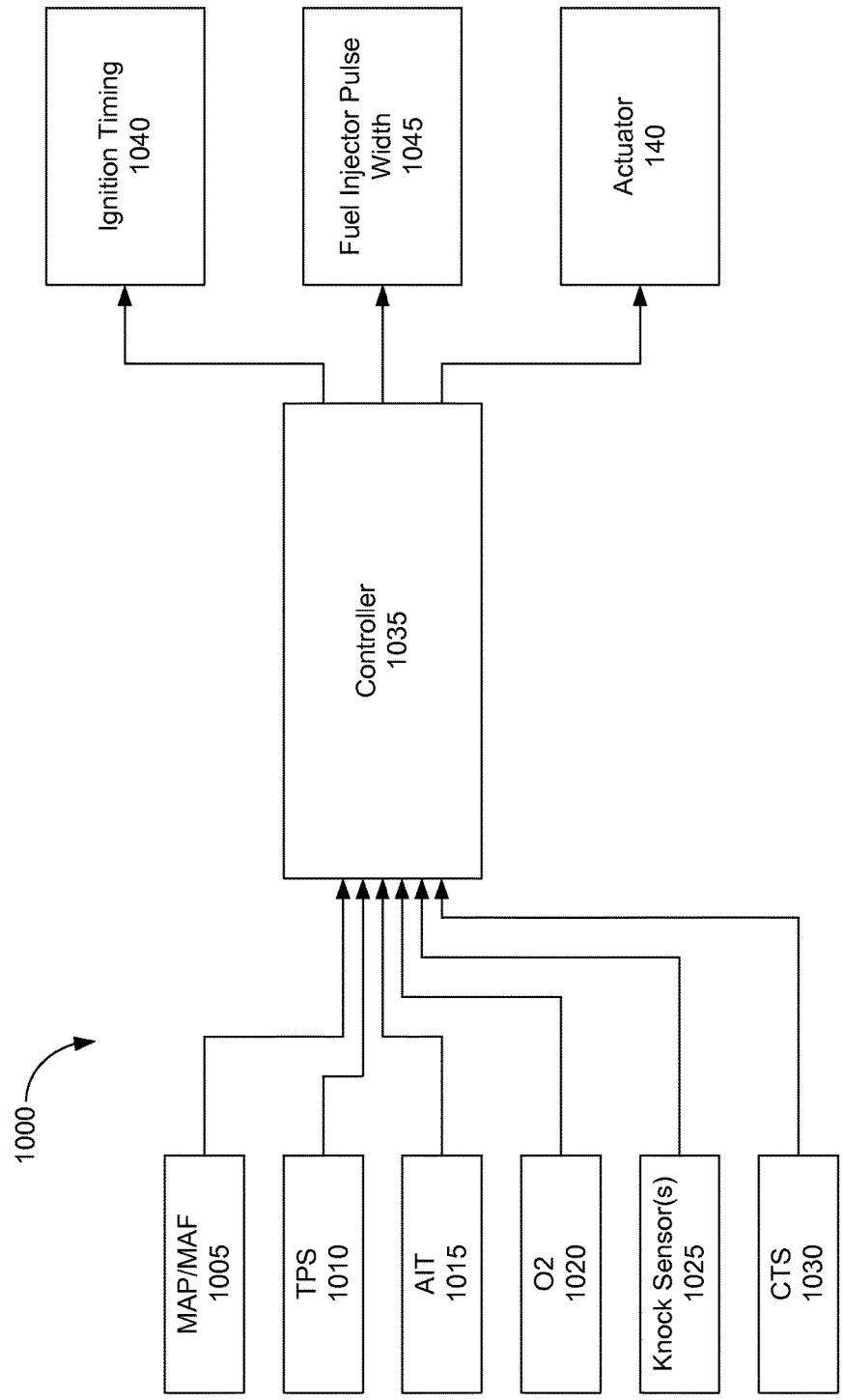
FIG. 11 is a schematic of an exemplary control system for the VCRE, in accordance with some embodiments of the present invention.

As shown in the simplified schematic of FIG. 11, for example, a control system 1000 can be used to monitor and control the position of the crankshaft 110 using feedback from various engine sensors and one of the actuators 140 discussed above, for example. The control system 1000 can use normal inputs from one or more sensors such as, for example and not limitation, manifold absolute pressure (MAP) sensors 1005 (or Mass airflow (MAF) sensors), throttle position sensors (TPS) 1010, air intake temperature (AIT) sensors 1015, oxygen (02) sensors 1020, knock sensors 1025, and coolant temperature sensors (CTS) 1030, among other sensors, to continuously move the crankshaft 110 to maintain optimum efficiency. In some embodiments, the actuator 140 can be a stepper motor, for example, enabling the control system 1000 to monitor the position of the crankshaft. In other embodiments, the system 1000 can include a position sensor (e.g., an optical or resistance sensor) to monitor the position of the crankshaft 110.

The system 1000 can use a controller 1035, for example, which can comprise a computer or microprocessor to constantly monitor and change engine parameters such as, for example and not limitation, ignition timing 1040, fuel injector pulse width 1045 (i.e., fuel mixture), and crankshaft 110 position (using one of the actuators 140 described above) to maximize efficiency, maintain engine temperature (i.e., prevent overheating), and to reduce knock. So, for example, the controller may use one or more servos, or stepper motors, to reposition the crankshaft 110 in real time.

While several possible embodiments are disclosed above, embodiments of the present invention are not so limited. For instance, while several possible configurations for the actuators 140 have been disclosed, other suitable actuators, materials, and combinations of materials could be selected without departing from the spirit of embodiments of the invention. A number of actuators and control systems, in addition to those described above, could be used, for example, without departing from the spirit of the invention. The location and configuration used for various features of embodiments of the present invention can be varied according to a particular engine displacement or configuration that requires a slight variation due to, for example, space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A unitary, flexible crankshaft system for an internal combustion engine comprising:
   a first, fixed output comprising a first end and a second end;
   a central portion, with a first end and a second end, comprising a first crankpin, a first main bearing journal disposed on a first side of the first crankpin, and a second main bearing journal disposed on a second side of the first crankpin;
   a second, fixed output comprising a first end and a second end;
   a first flex joint for flexible coupling the second end of the first output to the first end of the central portion;
   a second flex joint for flexibly coupling the first end of the second output to the second end of the central portion;
   a first main bearing cap, with a first end and a second end, in rotatable communication with the first main bearing journal, the first end pivotably coupled to a block of an engine and a second end pivotable about the first end; and
   a second main bearing cap, with a first end and a second end, in rotatable communication with the second main bearing journal, the first end pivotably coupled to the block of the engine and a second end pivotable about the first end;
   wherein the first and second flex joints enable the central portion to pivot about a first, fixed axis while the first and second outputs rotate about a second, fixed axis.

2. The system of claim 1, wherein the first end of the first main bearing cap and the first end of the second main bearing cap define the second, fixed axis.

3. The system of claim 1, wherein the first, fixed axis and the second, fixed axis are substantially parallel.

4. The system of claim 1, wherein the first and second flex joints comprise universal joints.

5. The system of claim 1, wherein the first and second outputs are substantially coaxial to the first main bearing journal and the second main bearing journal when the central portion of the crankshaft is in a middle compression ratio (MCR) position.

6. A crankshaft system for providing a variable compression ratio in an variable compression ration internal combustion engine (VCRE), the VCRE comprising a cylinder block and a cylinder head, the crankshaft system comprising:
   a crankshaft comprising:
      a first, fixed output comprising a first end and a second end;
      a central portion, with a first end and a second end, comprising one or more crankpins and two or more main bearing journals;
      a second, fixed output comprising a first end and a second end;
      a first flex joint for flexible coupling the second end of the first output to the first end of the central portion; and
      a second flex joint for flexibly coupling the first end of the second output to the second end of the central portion;
   a plurality of main bearing caps, each with a first end and a second end, the first ends pivotally coupled to the cylinder block, the plurality of main bearing caps rotatably supporting the two or more main bearing journals;
   a plurality of actuators, each disposed proximate the second end of the plurality of main bearing caps, to move the central portion of the crankshaft between a first, low compression ratio (LCR) position and a second, high compression ratio (HCR) position;
   a plurality of sensors, each sensor measuring at least one engine parameter of the VCRE; and
   a controller in communication with the plurality of sensors and configured to move the plurality of actuators in response to at least one signal from at least one of the plurality of sensors.

7. The system of claim 6, wherein a first sensor of the plurality of sensors comprises a knock sensor to provide a knock signal to the controller when preignition is detected in the VCRE; and
   wherein the controller signals the plurality of actuators to move the central portion of the crankshaft in a first direction to lower a compression ratio of the VCRE in response to the knock signal.

8. The system of claim 7, wherein the controller stops the plurality of actuators when the knock signal stops.

9. The system of claim 6, wherein a first sensor of the plurality of sensors comprises a throttle position sensor (TPS) to provide a TPS signal to the controller; and
   wherein the controller moves the plurality of actuators to move the central portion of the crankshaft in a first direction to lower a compression ratio of the VCRE in response to a signal from the TPS that a throttle of the VCRE has been opened a predetermined amount.

10. The system of claim 6, wherein a first sensor of the plurality of sensors comprises a throttle position sensor (TPS) to provide a TPS signal to the controller;
    wherein the TPS signal indicates that a throttle of the VCRE is substantially closed; and
    wherein the controller signals the plurality of actuators to move the central portion of the crankshaft to the HCR position.

11. The system of claim 6, wherein a first sensor of the plurality of sensors comprises a throttle position sensor (TPS) to provide a TPS signal to the controller;
    wherein the TPS signal indicates that a throttle of the VCRE is at wide open throttle (WOT); and
    wherein the controller signals the plurality of actuators to move the central portion of the crankshaft to the LCR position.

12. The system of claim 6, wherein the plurality of actuators comprise servo motors.

13. The system of claim 6, wherein the plurality of actuators comprises linear actuators.

* * * * *